J. HAY.
Harvester and Thrasher.
No. 198,801. Patented Jan. 1, 1878.
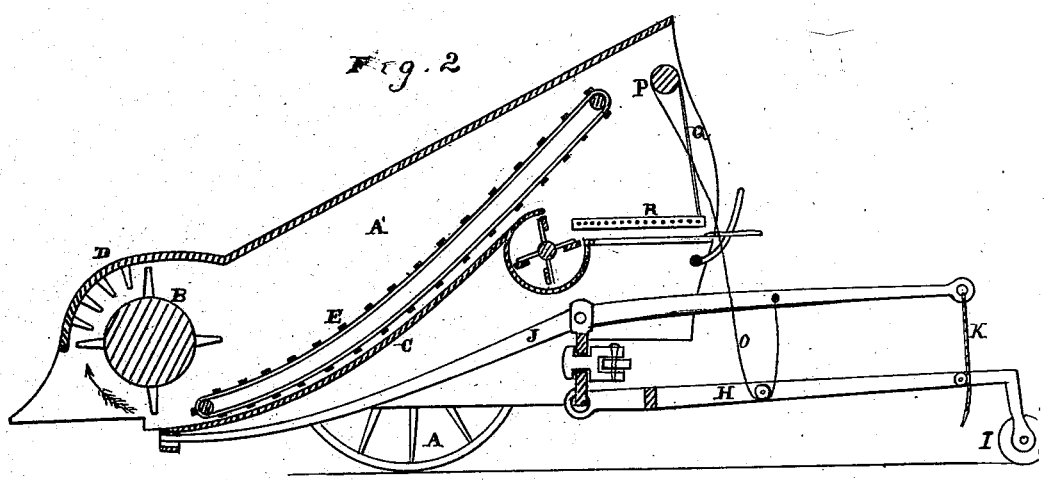
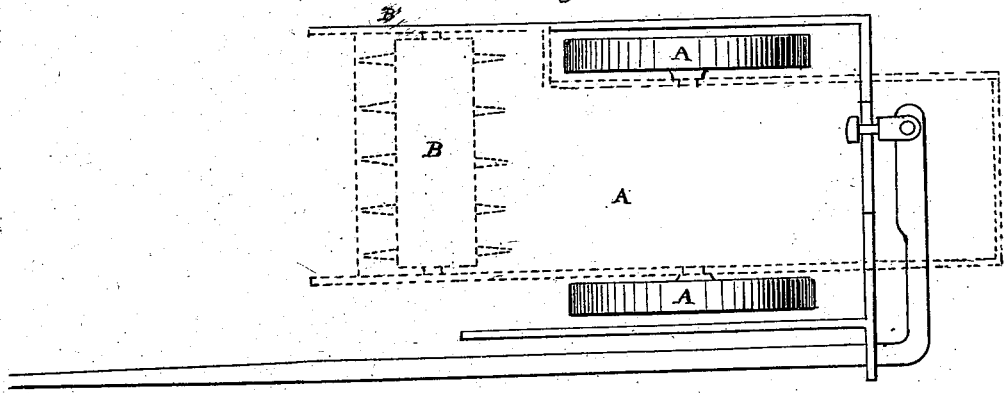
Witnesses
Jno. L. Boone
Frank A. Brooks
Inventor
John Hay
by Dewey & Co.
Attys.

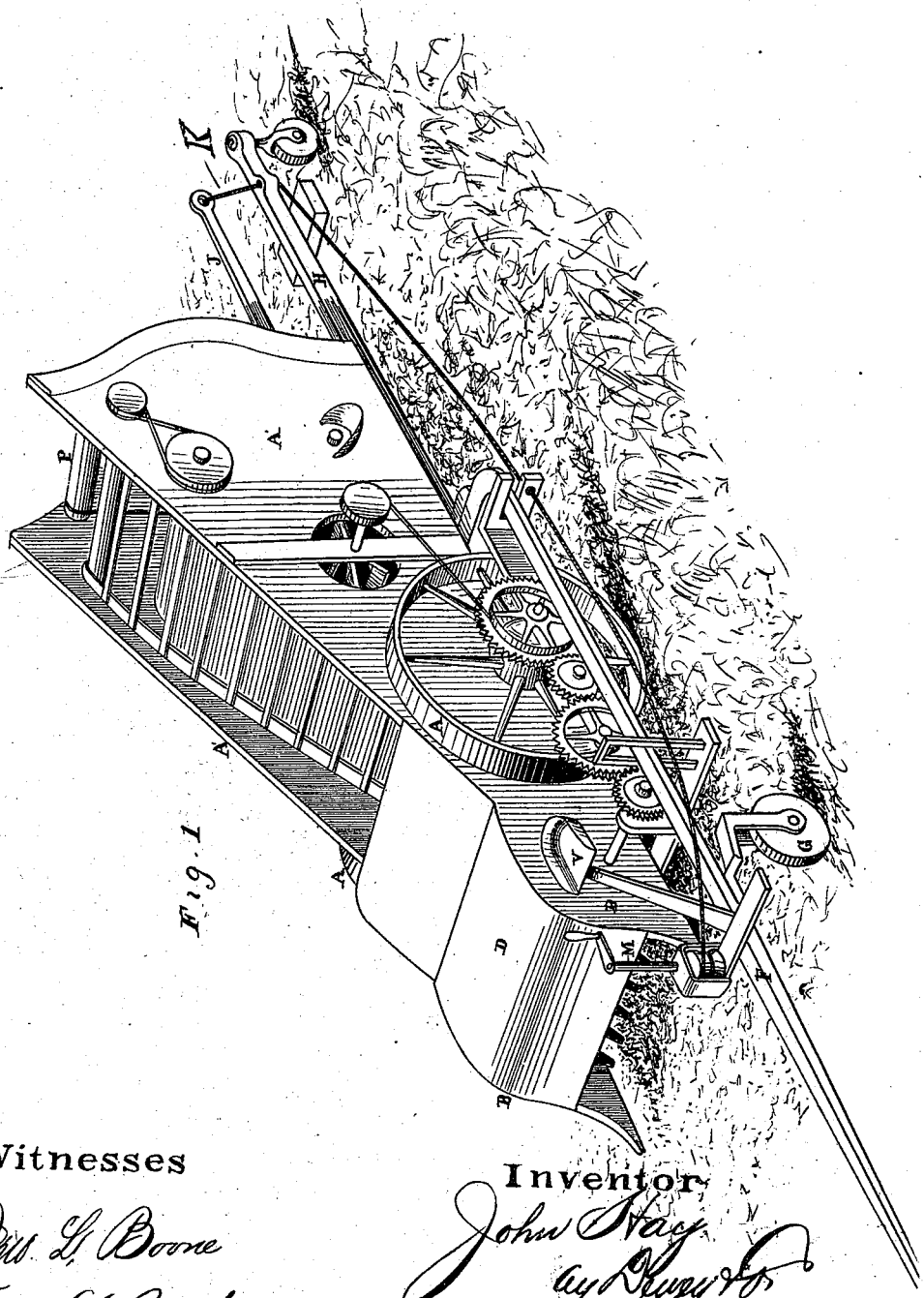

UNITED STATES PATENT OFFICE.

JOHN HAY, OF ELLIS, CALIFORNIA.

IMPROVEMENT IN HARVESTER AND THRASHER.

Specification forming part of Letters Patent No. 198,801, dated January 1, 1878; application filed October 9, 1877.

*To all whom it may concern:*

Be it known that I, JOHN HAY, of Ellis, county of San Joaquin and State of California, have invented an Improved Harvester; and I do hereby declare the following to be a full, clear, and exact description thereof, reference being had to the accompanying drawings.

The object of my invention is to provide a machine for harvesting standing grain in the field, by thrashing the grain directly from the heads, and cleaning and sacking it all in one operation.

My improved harvester is so constructed that, as it moves over the field, the heads of the grain are drawn in between the cylinder and concave, and thrashed without removing the heads from the straw, and so as to leave the straw standing upon the field, all as hereinafter more fully described.

Referring to the accompanying drawings, Figure 1 is a perspective view, with a portion of the top of the machine removed; Fig. 2, a longitudinal vertical section; Fig. 3, a horizontal sectional view.

A A represent the bearing-wheels, which are mounted in a frame, A' A', similar to an ordinary header-frame. Upon this frame I mount my reaping and thrashing cylinder, grain-carriers, and shoe. The cylinder B is constructed similar to the cylinder of an ordinary thrashing-machine, and is mounted between supporting sides B' B' so that about one-half its diameter will project in front of the header-frame. This cylinder is driven by gearings connected with the shaft of the bearing-wheels A A.

A curved bottom, C, extends from the front of the header-frame below the cylinder upward and backward, as represented, to the rear of the machine. A convex cover or housing, D, is constructed above the cylinder, so as to leave a throat or opening between the front of the header-frame and the forward end of the housing of about one-fourth the circumference of the cylinder, and the under side of this housing forms the concave.

The grain-carrier E is arranged to travel inside of the boxing of the machine above the curved bottom C, similar to the grain-carrier of an ordinary thrasher, so as to carry the grain to the shoe R, at the rear of the thrasher, in the same manner. The lower end of this carrier passes under the cylinder a short distance, as represented.

The pole F extends from the rear of the machine along one side and to a distance in front of it, as shown. Its rear end is bent at right angles, so as to extend across the rear of the machine, and the extremity of this bent portion is attached by a movable jaw and bolt near the opposite side of the machine, so that the line of draft will be equalized.

A caster-wheel, G, supports the pole opposite the front end of the machine, and the driver's seat V is mounted upon it. A beam, H, extends backward from the rear of the header-frame to a distance behind it, and the rear end of this beam is supported by a caster-wheel, I. The forward end of the beam is hinged to the rear of the header-frame, so that its caster-wheel will remain upon the ground while the front of the machine is raised or lowered about the bearing-wheels as a center, similar to the movement of an ordinary header.

A beam or lever, J, has its forward end attached to the front of the header-frame, while it extends back underneath the shoe, and to a distance in rear of the machine, being pivoted at or near its middle to the rear cross-timber of the header-frame. A rope, K, is attached to the rear end of this lever, and passes down around a pulley on the rear end of the beam H; thence it passes forward alongside of the machine, and its opposite end is attached to a vertical crank-shaft, M, which is within easy reach of the driver, so that when this rope is wound upon the crank-shaft the rear end of the lever J is drawn downward and the forward end of the machine raised. Another rope, O, has one end attached to the lever J near the frame, and passes down around a pulley on the side of the beam H; thence up to a shaft or drum, P, which extends across the rear of the machine, to which its opposite end is attached. This drum or shaft has a coiled spring inside of it, or is otherwise counterbalanced so that it will wind the rope up.

The tension of this spring is sufficient to draw the rear end of the machine down and elevate its forward end when the rope K is slackened, so that the elevation of the thrashing-cylinder can be easily regulated by the driver, by turning the crank-shaft M, while he sits on the seat.

A cord, Q, has one end attached to the drum P, while its opposite end is attached to the rear end of the screen R of the shoe, so that as the drum rotates to lower the rear end of the machine the cord Q is wound up, and the rear end of the screen raised.

A reverse movement of the roller, when the rear end of the machine rises, lengthens the rope and lowers the rear end of the screen correspondingly, thus keeping the screen in its proper horizontal position, without regard to the raising or lowering of the machine when it is in operation.

The machine is moved forward with the feed throat or opening through which the grain is admitted to the cylinder about on a level with the heads of the standing grain.

The rotation of the cylinder upward into the concave as it passes over will then draw the heads in between the cylinder and concave, thus thrashing the grain from the heads by a stripping action without separating the heads from the stalk. The thrashed grain is thrown by the centrifugal action of the cylinder directly back upon the grain-carrier, which elevates it to the shoe, by which it is cleaned, and from which it passes to the sacking apparatus.

This machine is light and easily handled, and will harvest the grain and put it into sacks with little trouble and expense.

Having thus described my invention, what I claim, and desire to secure by Letters Patent, is—

1. The combination, with the thrashing-cylinder B, mounted in front of the header-frame, between the sides B' B', and having the concave D of the curved bottom C and curved carrier E, said curved bottom and carrier extending underneath the cylinder, so as to form a throat, into which the heads of standing grain are drawn by the rotation of the cylinder, and deposited directly upon the carrier, substantially as herein described.

2. The frame A' A', mounted upon the wheels A A, as described, in combination with the draft-pole F, the rear end of which is bent across the rear of the machine, and attached to it near one side by a movable joint, while the pole extends along the opposite side of the machine and to a distance in front of it, substantially as and for the purpose described.

3. The frame A' A', having the hinged beam H extending in its rear, and supported at its extremity by a caster-wheel, I, in combination with the rigid beam or lever J of the thrasher-frame, said lever being connected with the crank-shaft M by a rope, K, which is attached to the extremity of the lever J, and passes down around a pulley on the beam H, and thence to the winding-shaft M, substantially as and for the purpose described.

4. The spring roller or drum P, connected with the lever J by a rope, O, which passes down around a pulley on the beam H, and thence up to the drum, substantially as and for the purpose described.

5. The spring roller or drum P, arranged to be rotated by the raising and lowering of the rear end of the thrasher-frame, and connected with the outer end of the screen R by a cord, Q, substantially as and for the purpose described.

6. A harvesting-machine consisting of a cylinder, B, mounted upon a header-frame in front of a traveling thrasher, and driven by a gearing from one of the bearing-wheels of the frame, and having the concave D mounted above the thrasher, and provided with a curved bottom, C, grain-carrier E, and shoe R, all combined and arranged to operate substantially as and for the purpose described.

In witness whereof I have hereunto set my hand and seal.

JOHN HAY. [L. S.]

Witnesses:
   JOS. MCLEAN,
   JAMES LUDESY.